(12) United States Patent
Franz et al.

(10) Patent No.: US 10,378,432 B2
(45) Date of Patent: Aug. 13, 2019

(54) RADIAL TURBINE CASING

(71) Applicant: GM GLOBAL TECHNOLOGY OPERATIONS LLC, Detroit, MI (US)

(72) Inventors: Michael Franz, Ruesselsheim (DE); Hans-Joerg Heidermann, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 15/332,039

(22) Filed: Oct. 24, 2016

(65) Prior Publication Data

US 2017/0114668 A1  Apr. 27, 2017

(30) Foreign Application Priority Data

Oct. 22, 2015 (DE) .................. 10 2015 013 652
Oct. 22, 2015 (DE) .................. 10 2015 014 900

(51) Int. Cl.
| | |
|---|---|
| *F01D 9/02* | (2006.01) |
| *F02C 6/12* | (2006.01) |
| *F01D 25/24* | (2006.01) |
| *F02B 37/00* | (2006.01) |

(52) U.S. Cl.
CPC ............ *F02B 37/00* (2013.01); *F01D 9/026* (2013.01); *F01D 25/24* (2013.01); *F02C 6/12* (2013.01); *F05D 2220/40* (2013.01); *F05D 2240/14* (2013.01); *F05D 2260/96* (2013.01); *Y02T 10/144* (2013.01)

(58) Field of Classification Search
CPC .......... F01D 9/026; F01D 25/24; F02B 37/00; F02C 6/12; F05D 2220/40; F05D 2240/14; F05D 2260/96
See application file for complete search history.

(56) References Cited

U.S. PATENT DOCUMENTS

| | | | | |
|---|---|---|---|---|
| 4,678,397 A | * | 7/1987 | Komatsu | F01D 17/146 415/151 |
| 6,742,989 B2 | * | 6/2004 | Osako | F01D 5/048 415/204 |
| 8,591,177 B2 | * | 11/2013 | Yokoyama | F01D 9/026 415/119 |
| 9,587,554 B2 | * | 3/2017 | Hoshi | F01D 9/026 |
| 2003/0077170 A1 | | 4/2003 | Osako et al. | |
| 2013/0266433 A1 | | 10/2013 | Yokoyama et al. | |
| 2014/0363282 A1 | | 12/2014 | Katou | |
| 2015/0369251 A1 | | 12/2015 | Jung et al. | |
| 2016/0319683 A1 | * | 11/2016 | Yokoyama | F01D 9/026 |

* cited by examiner

*Primary Examiner* — Ninh H. Nguyen
*Assistant Examiner* — Brian P Wolcott
(74) *Attorney, Agent, or Firm* — Lorenz & Kopf, LLP

(57) ABSTRACT

A casing for a radial turbine in an exhaust gas turbocharger for a motor vehicle includes a gas duct having an inlet section and an adjoining spiral section, between which a casing tab is arranged. The spiral section features a radially inner turbine inlet, the axial width of which in the region of the casing tab circumferentially decreases toward an end face of the casing tab in a circumferential section. An end face of the casing tab is inclined relative to a rotational axis of the radial turbine in an axial section.

16 Claims, 1 Drawing Sheet

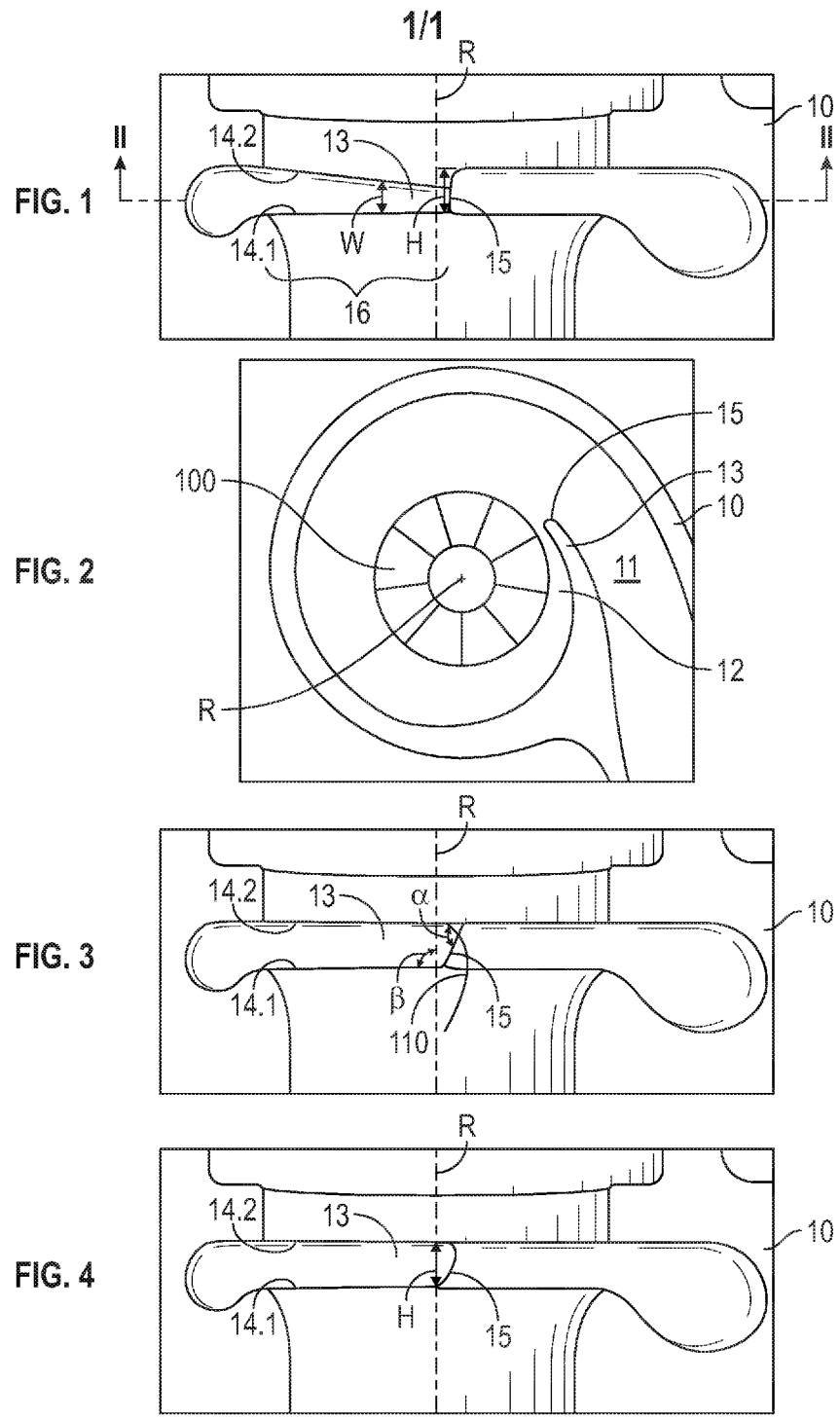

RADIAL TURBINE CASING

CROSS-REFERENCE TO RELATED APPLICATIONS

This application claims priority to German Patent Application No. 102015014900.8, filed Oct. 22, 2015, and German Patent Application No. 102015013652.6, filed Oct. 22, 2015, which are incorporated herein by reference in their entirety.

TECHNICAL FIELD

The present disclosure pertains to a casing for a radial turbine, a radial turbine with such a casing, an exhaust gas turbocharger with such a radial turbine and a motor vehicle with such an exhaust gas turbocharger.

BACKGROUND

Exhaust gas turbochargers for motor vehicles with radial turbines, which feature a casing and a bladed rotor arranged therein, are generally known. The casing features a gas duct with an inlet section and an adjoining spiral section, between which a casing tab is arranged.

When the rotating blades of the rotor move past an end face of the casing tab, undesirable noises can develop, particularly in a frequency range that corresponds to the rotor speed multiplied by the number of blades.

Accordingly, it is desirable to provide an improved radial turbine, particularly with respect to its acoustic properties.

SUMMARY

In an embodiment of the present disclosure, a casing for an exhaust gas turbocharger for a motor vehicle, particularly a radial turbine with a bladed rotor arranged in a casing, features an exhaust gas duct with an inlet section and an adjoining spiral section. A casing tab is arranged radially between the inlet section and the spiral section.

In an embodiment, the inlet section features an inlet opening for supplying exhaust gas of an internal combustion engine. The spiral section is in an embodiment realized in a spiral-like or screw-like fashion and has a radius that decreases in the flow-through direction. In an embodiment, a (flow) cross section of the spiral section, through which the exhaust gas flows in the circumferential direction, also decreases in the flow-through direction. A radial width and/or a maximum axial height of the spiral section referred to the circumferential direction likewise decreases in the flow-through direction in an enhancement. In this way, an advantageous gas supply to the rotor can be realized in an embodiment. The rotor is in an embodiment rotationally coupled to a compressor of the exhaust gas turbocharger, namely the rotor of the compressor.

In an embodiment, the spiral section features a radially inner turbine inlet, the axial width or height of which in the region of the casing tab circumferentially decreases toward an end face of the casing tab in a circumferential section.

In an embodiment, a gas flow flowing through the turbine inlet can thereby be reduced in the region of the end face of the casing tab such that the noise developed by blades moving past the end face of the casing tab can also be reduced or essentially eliminated.

In an embodiment, the radially inner turbine inlet is realized in a ring-shaped or ring-like fashion. In an embodiment, it features two walls and/or radially inner edges that lie axially opposite of one another. In an embodiment, the radially inner turbine inlet includes a radially inner turbine inlet duct that is respectively formed or defined, in particular, by the two walls, a radially inner opening that is respectively formed or defined by two or the two radially inner edges lying axially opposite of one another and/or a minimal (flow) cross section (of the radially inner turbine inlet duct) that is respectively formed or defined by the two walls and through which the exhaust gas respectively flows in the radial direction. In an embodiment, the opening formed or defined by the two radially inner edges may simultaneously form a minimal (flow) cross section that is respectively formed or defined by the two walls and through which the exhaust gas respectively flows or can flow, in particular, in the radial direction. The minimal (flow) cross section, through which the exhaust gas respectively flows in the radial direction, likewise may be arranged radially outside of the edges in the duct if the walls of the minimal (flow) cross section axially diverge toward the edges in the radial direction. In an embodiment, the turbine inlet lies opposite of the radially outer blade tips of the rotor.

In an embodiment, the end face of the casing tab is a point or an edge or an end of the casing tab in the circumferential direction.

In an embodiment, the axial width or height of the radially inner turbine inlet, particularly a minimal axial spacing between the two axially opposite walls of a or the radially inner turbine inlet duct, an axial spacing between its two radially inner or rotor-side) edges and/or an axial width or height of its minimal (flow) cross section, through which the exhaust gas respectively flows in the radial direction, circumferentially decreases toward the end face of the casing tab in the circumferential section. This decrease takes place monotonous, in particular strictly monotonous, in an enhancement. In an embodiment, the axial width or height of the radially inner turbine inlet is a minimal axial spacing between the two axially opposite walls of the radially inner turbine inlet duct, an axial spacing between its two (radially inner or rotor-side) edges and/or an axial width or height of its minimal (flow) cross section, through which the exhaust gas respectively flows in the radial direction. In an embodiment, a gas flow can thereby be reduced in the region of the end face of the casing tab such that the noise developed by blades moving past the end face of the casing tab can also be reduced or essentially eliminated.

In an embodiment, the axial width in the circumferential section steadily or continuously decreases circumferentially toward the end face of the casing tab, particularly linear or circumferentially progressive, particularly monotonous, toward the end face of the casing tab or circumferentially digressive, particularly monotonous, toward the end face of the casing tab. In an embodiment, the axial width in the circumferential section decreases circumferentially toward the end face of the casing tab abruptly or in one or more increments. In an embodiment, a gas flow can thereby be reduced in the region of the end face of the casing tab such that the noise developed by blades moving past the end face of the casing tab can also be reduced or essentially eliminated.

In an embodiment, the circumferential section features the end face or extends away from the end face opposite to the circumferential direction. In an embodiment, a gas flow can thereby be reduced, particularly on the end face of the casing tab itself such that the noise developed by blades moving past the end face of the casing tab can be additionally reduced.

In an embodiment, the circumferential section additionally or alternatively extends circumferentially over at least 10°, particularly over at least 20°, particularly over at least 30°, and/or the entire (length of the) casing tab. In an embodiment, a gas flow can thereby be further reduced in the region of the end face of the casing tab such that the noise developed by blades moving past the end face of the casing tab can be additionally reduced.

In an embodiment, the axial width additionally may also decrease outside or circumferentially upstream of the casing tab, wherein the axial width particularly decreases circumferentially over at least essentially the entire turbine inlet in an enhancement.

In an embodiment, one or both (axially opposite) walls, particularly (radially inner or rotor-side) edges, of the turbine inlet in the circumferential section are plane or straight. In an embodiment, one or both (axially opposite) walls, particularly (radially inner or rotor-side) edges, of the turbine inlet in the circumferential section are curved, particularly in a convex or concave fashion. In an embodiment, one of the two (axially opposite) walls, particularly (radially inner or rotor-side) edges, of the turbine inlet in the circumferential section is plane or straight whereas the other, opposite wall or edge is curved, particularly in a convex or concave fashion. In an embodiment, a gas flow can thereby be further reduced in the region of the end face of the casing tab such that the noise developed by blades moving past the end face of the casing tab can be additionally reduced.

In an embodiment, a wall, particularly an edge, of the turbine inlet in the circumferential section, which particularly is located on the outlet side or downstream referred to the axial flow-through direction, includes an angle $\beta$ (FIG. 3) of at least 80° and/or no more than 100° with a rotational axis of the radial turbine or, in an enhancement, extends at least essentially perpendicular to this rotational axis. In an embodiment, a gas flow can thereby be further reduced in the region of the end face of the casing tab such that the noise developed by blades moving past the end face of the casing tab can be additionally reduced.

In an embodiment that may be realized in combination with or also independently of an embodiment described herein, in which the axial width of the radially inner turbine inlet in the region of the casing tab circumferentially decreases toward the end face of the casing tab in the circumferential section, the end face of the casing tab is inclined relative to a or the rotational axis of the radial turbine in an axial section.

In an embodiment, a flow pulse in the region of the end face of the casing tab can thereby be prolonged and therefore weakened such that the noise developed by blades moving past the end face of the casing tab can be reduced or, in an enhancement, at least essentially eliminated.

In an embodiment, the axial section extends over at least 25%, particularly at least 50%, particularly at least 75%, particularly at least 90% of the axial height of the end face. The axial section extends over at least essentially the entire (axial height of the) end face in an enhancement. The axial section particularly may also consist of the entire end face. In an embodiment, a flow pulse in the region of the end face of the casing tab can thereby be further weakened such that the noise developed by blades moving past the end face of the casing tab can be additionally reduced.

In an embodiment, the end face is straight in the axial section. In another embodiment, the end face is curved in the axial section, particularly curved in a convex or concave fashion. In an embodiment, a flow pulse in the region of the end face of the casing tab can thereby be further weakened such that the noise developed by blades moving past the end face of the casing tab can be additionally reduced.

In an embodiment, an upstream end of the end face referred to the axial flow-through direction is arranged in front of a downstream end of the end face referred to the axial flow-through direction in the circumferential direction toward the end face of the casing tab. In another embodiment, the upstream end of the end face referred to the axial flow-through direction is arranged behind a downstream end of the end face referred to the axial flow-through direction in the circumferential direction toward the end face of the casing tab. In an embodiment, a flow pulse in the region of the end face of the casing tab can thereby be further weakened such that the noise developed by blades moving past the end face of the casing tab can be additionally reduced.

In an embodiment, the end face of the casing tab includes an angle $\alpha$ (FIG. 3) of at least 10°, particularly at least 30°, particularly at least 60°, particularly at least 75°, with a pressure side and/or a suction side of a radially outer blade tip of the rotor of the radial turbine in each intersecting point of the end face with the pressure or suction side within the axial section. If the smaller of the two angles relative to the pressure or suction side to both sides of the end face is in an embodiment customarily defined as the angle included thereby, this angle may amount to no more than 90°. The larger of these two angles, in contrast, amounts in this embodiment to no more than 170°, particularly no more than 150°, particularly no more than 120°, particularly no more than 105°. In an embodiment, an intersecting point between the end face and the pressure or suction side is the point, at which the radial projection of the end face intersects the pressure or suction side or at which the end face and the pressure or suction side have the minimal spacing from one another. In an embodiment, a flow pulse in the region of the end face of the casing tab can thereby be further weakened such that the noise developed by blades moving past the end face of the casing tab can be additionally reduced.

Whenever the present description refers to an angle relative to a curved wall, edge, end face, pressure or, suction side, this customarily refers to the angle relative to the tangential plane or tangent on this curved wall, edge, end face, pressure or suction side in an embodiment.

In an embodiment, the gap between the radially outer blade tips of the rotor and the radially inner turbine inlet or its two edges can be advantageously reduced and the efficiency can thereby be improved because the decreasing axial width and/or inclined end face makes it possible to reduce the noise developed by the blade tips moving past the end face without having to increase the gap for this purpose.

BRIEF DESCRIPTION OF THE DRAWINGS

The present disclosure will hereinafter be described in conjunction with the following drawing figures, wherein like numerals denote like elements.

FIG. 1 shows an axial section through part of a casing of a radial turbine of an exhaust gas turbocharger of a motor vehicle according to an embodiment of the present disclosure;

FIG. 2 shows a section along the line II-II in FIG. 1;

FIG. 3 shows an axial section through part of a casing of a radial turbine of an exhaust gas turbocharger of a motor vehicle according to another embodiment of the present disclosure; and FIG. 4 shows an axial section through part of a casing of a radial turbine of an exhaust gas turbocharger of a motor vehicle according to another embodiment of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIGS. 1, 2 show part of a casing 10 of a radial turbine of an exhaust gas turbocharger of a motor vehicle according to an embodiment of the present disclosure in the form of two sections extending perpendicular to one another, wherein the section in FIG. 1 contains a rotational axis R indicated with a dot-dash line and a bladed rotor 100, which is illustrated in FIG. 2 and arranged in the casing 10, is masked out in FIG. 1. The casing 10 features an exhaust gas duct with an inlet section II and an adjoining spiral section 12, between which a casing tab 13 is arranged.

The spiral section 12 features a radially inner, ring-shaped turbine inlet with two walls or edges 14.1, 14.2 that lie axially opposite of one another in the circumferential direction and the axial width or the (minimal) axial spacing W of which in the region of the casing tab 13 circumferentially decreases toward an end face 15 of the casing tab in a circumferential section 16, namely in a steady and strictly monotonous fashion in the exemplary embodiment. The circumferential section 16 features the end face 15 or respectively extends opposite to the circumferential direction or away from the end face over at least 10°.

In an exemplary embodiment, either walls or edges 14.1, 14.2 of the turbine inlet in the circumferential section 16 are plane or straight. In a modified embodiment, one or both walls or edges 14.1, 14.2 may also be curved. In the exemplary embodiment, the wall or edge 14.1 of the turbine inlet in the circumferential section 16, which is located on the outlet side or downstream referred to the axial flow-through direction, extends essentially perpendicular to the rotational axis R of the radial turbine.

FIG. 3 shows an axial section through part of a casing 10 of a radial turbine of an exhaust gas turbocharger of a motor vehicle according to another embodiment of the present disclosure in the form of an illustration corresponding to FIG. 1. Corresponding characteristics are identified by identical reference symbols such that we refer to the preceding description and only differences are discussed below.

In the embodiment according to FIG. 3, the end face 15 of the casing tab 13 is inclined relative to the rotational axis of the radial turbine in an axial section, which in the exemplary embodiment extends over the entire axial height H (FIG. 4) of the end face or forms the (entire) end face. The end face 15 is straight in the embodiment according to FIG. 3.

In the embodiment according to FIG. 3, an upstream end (top in FIG. 3) of the end face 15 referred to the axial flow-through direction (from top to bottom in FIG. 3) is arranged behind a downstream end (bottom in FIG. 3) of the end face 15 referred to the axial flow-through direction in the circumferential direction (horizontal in FIG. 3) toward the end face 15 of the casing tab 13 (i.e. toward the right in FIG. 3). In other words, the end face 15 is inclined toward the right in FIG. 3. In a not-shown modified embodiment, it may conversely also be inclined toward the left and its upstream end (top and FIG. 3) may be arranged in front of the downstream end (bottom in FIG. 3) of the end face 15 referred to the axial flow-through direction in the circumferential direction toward the end face 15 of the casing tab (i.e. toward the right in FIG. 3).

In the embodiment according to FIG. 3, the end face 15 of the casing tab 13 includes an angle of at least 10° with a pressure side and/or a suction side of a radially outer blade tip of the rotor 100 of the radial turbine in each intersecting point of the end face with the pressure or suction side within the axial section. The smaller of the two angles relative to the pressure or suction side to both sides of the end face is customarily defined as the angle included thereby. In order to elucidate this aspect, a pressure or suction side 110 of a radially outer blade tip of the rotor 100, as well as the almost right angle relative to the end face 15 in the current intersecting point, is indicated in FIG. 3.

FIG. 4 shows an axial section through part of a casing 10 of a radial turbine of an exhaust gas turbocharger of a motor vehicle according to yet another embodiment of the present disclosure in the form of an illustration corresponding to FIGS. 1, 3. Corresponding characteristics are identified by identical reference symbols such that we refer to the preceding description and only differences are discussed below.

In the embodiment according to FIG. 4, the end face 15 is curved in a convex fashion in the axial section, which in the exemplary embodiment extends over the entire (axial height of the) end face or forms the (entire) end face. In a not-shown modified embodiment, it may conversely also be curved in a concave fashion. Although exemplary embodiments were elucidated in the preceding description, it should be noted that numerous modifications are possible.

For example, the aspects of the decreasing axial width W (see FIG. 1) and of the inclined end face 15 (see FIGS. 3, 4) were discussed separately, but could also be combined in a modified embodiment.

While at least one exemplar/embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A casing for a radial turbine in an exhaust gas turbocharger for a motor vehicle, the casing comprising:
   a gas duct having an inlet section adjoined to a spiral section, and a casing tab arranged therebetween, wherein the adjoining spiral section includes a radially inner turbine inlet, and an axial width of the adjoining spiral section in a region of the casing tab circumferentially decreases toward an end face of the casing tab in a circumferential section,
   wherein an edge of the radially inner turbine inlet in the circumferential section, which is located on an outlet side includes an angle in a range of 80° to 100° with a rotational axis of the radial turbine.

2. The casing according to claim 1, wherein the axial width in the circumferential section decreases in a steady fashion.

3. The casing according to claim 1, wherein the circumferential section includes the end face.

4. The casing according to claim 1, wherein the circumferential section extends over at least 10°.

5. The casing according to claim 1, wherein at least one edge of the radially inner turbine inlet in the circumferential section is straight.

6. The casing according to claim 1, wherein at least one edge of the radially inner turbine inlet in the circumferential section is realized in a curved fashion.

7. The casing according to claim 1, wherein an end face of the casing tab is inclined relative to a rotational axis of the radial turbine in an axial section.

8. The casing according to claim 7, wherein the axial section extends over at least 25% of an axial height of the end face.

9. The casing according to claim 7, wherein the end face is straight in the axial section.

10. The casing according to claim 7, wherein the end face is curved in the axial section.

11. The casing according to claim 7, wherein an upstream end of the end face relative to an axial flow-through direction is arranged in front of a downstream end of the end face relative to the axial flow-through direction in a circumferential direction toward the end face of the casing tab.

12. The casing according to claim 7, wherein an upstream end of the end face relative to an axial flow-through direction is arranged behind a downstream end of the end face relative to the axial flow-through direction in a circumferential direction toward the end face of the casing tab.

13. A radial turbine, comprising:
a casing comprising a gas duct having an inlet section adjoined to a spiral section, and a casing tab arranged therebetween, wherein the adjoining spiral section includes a radially inner turbine inlet, and an axial width of the adjoining spiral section in a region of the casing tab circumferentially decreases toward an end face of the casing tab in a circumferential section; and
a bladed rotor arranged in the casing,
wherein the end face of the casing tab includes an angle in a range of 10° to 75° with a pressure side of a blade tip of the bladed rotor in each intersecting point of the end face with the pressure side within the axial section.

14. The radial turbine according to claim 13, wherein the end face of the casing tab includes an angle in a range of 10° to 75° with a suction side of a blade tip of the bladed rotor in each intersecting point of the end face with the suction side within the axial section.

15. An exhaust gas turbocharger comprising:
a radial turbine including a casing comprising a gas duct having an inlet section adjoined to a spiral section, and a casing tab arranged therebetween, wherein the adjoining spiral section includes a radially inner turbine inlet, and an axial width of the adjoining spiral section in a region of the casing tab circumferentially decreases toward an end face of the casing tab in a circumferential section and a bladed rotor arranged in the casing,
wherein an end face of the casing tab is inclined relative to a rotational axis of the radial turbine in an axial section and the end face is curved in the axial section.

16. A motor vehicle comprising the exhaust gas turbocharger according to claim 15.

* * * * *